US008972745B2

(12) United States Patent
Jordan et al.

(10) Patent No.: US 8,972,745 B2
(45) Date of Patent: Mar. 3, 2015

(54) SECURE DATA HANDLING IN A COMPUTER SYSTEM

(75) Inventors: Michael J. Jordan, Hurley, NY (US);
Angel Nunez Mencias, Stuttgart (DE);
Joerg Schmidbauer, Boeblingen (DE);
Klaus Werner, Moetzingen (DE)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 12/967,346

(22) Filed: Dec. 14, 2010

(65) Prior Publication Data
US 2011/0145596 A1    Jun. 16, 2011

(30) Foreign Application Priority Data

Dec. 15, 2009    (EP) ..................................... 09179296

(51) Int. Cl.
*G06F 12/14*    (2006.01)
*G06F 21/60*    (2013.01)
(Continued)

(52) U.S. Cl.
CPC ........ *G06F 12/1466* (2013.01); *G06F 12/1441* (2013.01)
USPC ............... 713/189; 713/176; 380/277; 726/2; 726/26; 726/27

(58) Field of Classification Search
CPC ....... G06F 21/60; G06F 21/62; G06F 21/602; G06F 21/6218; G06F 21/70; G06F 2221/2107; G11B 20/0021; H04L 9/08; H04L 9/28; H04L 9/3281
USPC ............ 713/176, 189; 380/277; 726/2, 26, 27
See application file for complete search history.

(56) References Cited

U.S. PATENT DOCUMENTS

| 5,164,988 A | 11/1992 | Matyas et al. |
| 5,991,399 A | 11/1999 | Graunke et al. |

(Continued)

FOREIGN PATENT DOCUMENTS

| EP | 1777628 A1 | 4/2007 |
| EP | 1 998 270 A1 | 3/2008 |

(Continued)

OTHER PUBLICATIONS

U.S. Appl. No. 12/550,667, to Meissner et al., entitled "Conversion of Cryptographic Key Protection", filed Aug. 31, 2009, assigned to International Business Machines Corporation.

(Continued)

*Primary Examiner* — Michael Chao
*Assistant Examiner* — Shiuh-Huei Ku
(74) *Attorney, Agent, or Firm* — Matthew J. Bussan

(57) ABSTRACT

A computer system includes a first storage area accessible by an operating system and a second storage area accessible by authorized functions only. According to some embodiments of the invention at least one protected storage area is implemented into the second storage area, wherein the operating system installs at least one secret key and/or at least one customized processing function into regions of the at least one protected storage area, wherein the operating system transfers data and/or parameters to process into regions of the at least one protected storage area, wherein the operating system selects one of the customized processing functions to execute, wherein the selected customized processing function is executed and accesses storage regions of the at least one protected storage area to process the data and/or parameters, and wherein resulting process data is read from the at least one protected storage area.

17 Claims, 4 Drawing Sheets

(51) Int. Cl.
  *G06F 21/62* (2013.01)
  *G06F 21/70* (2013.01)
  *H04L 9/08* (2006.01)
  *H04L 9/28* (2006.01)

(56) References Cited

U.S. PATENT DOCUMENTS

| | | | |
|---|---|---|---|
| 5,995,625 A | 11/1999 | Sudia et al. | |
| 6,389,402 B1 * | 5/2002 | Ginter et al. | 705/51 |
| 6,574,733 B1 | 6/2003 | Langford | |
| 6,728,379 B1 | 4/2004 | Ishibashi et al. | |
| 6,839,437 B1 | 1/2005 | Crane et al. | |
| 7,103,782 B1 | 9/2006 | Tugenberg et al. | |
| 7,747,876 B2 * | 6/2010 | Oxford | 713/193 |
| 8,190,914 B2 * | 5/2012 | van Riel et al. | 713/193 |
| 8,498,418 B2 | 7/2013 | Meissner et al. | |
| 2004/0005061 A1 | 1/2004 | Buer et al. | |
| 2004/0111631 A1 | 6/2004 | Kocher et al. | |
| 2006/0090084 A1 * | 4/2006 | Buer | 713/189 |
| 2006/0210084 A1 | 9/2006 | Fransdonk | |
| 2006/0236127 A1 | 10/2006 | Kurien et al. | |
| 2007/0136579 A1 | 6/2007 | Levy et al. | |
| 2007/0220610 A1 | 9/2007 | Van Loenen et al. | |
| 2007/0230706 A1 | 10/2007 | Youn | |
| 2008/0019526 A1 | 1/2008 | Fu et al. | |
| 2008/0069341 A1 | 3/2008 | Relyea | |
| 2008/0080708 A1 | 4/2008 | McAlister et al. | |
| 2008/0104709 A1 | 5/2008 | Averyt et al. | |
| 2008/0273697 A1 | 11/2008 | Greco et al. | |

FOREIGN PATENT DOCUMENTS

| | | |
|---|---|---|
| WO | WO02093849 A3 | 11/2002 |
| WO | WO2008042175 A3 | 4/2008 |

OTHER PUBLICATIONS

International Search Report and Written Opinion for PCT/EP2010/062362.

"An Overview of Secret Key and Identity Management for System-on-Chip Architects," Elliptic Technologies Inc., pp. 1-8, May 2009.

"z/Architecture-Principles of Operation," SA22-7832-07, Feb. 2009.

* cited by examiner

SECURE DATA HANDLING IN A COMPUTER SYSTEM

BACKGROUND OF THE INVENTION

1. Field of the Invention

The present invention relates in general to the field of secure data storage and access for operating systems especially in a distributed computer system, and in particular to a computer system and a method for secure data handling in a computer system. Still more particularly, the present invention relates to a data processing program and a computer program product for secure data handling in a computer system.

2. Description of the Related Art

Sensitive data, when located in a main memory of a computer system, is a potential security risk. For example, the memory may not be fully protected against unauthorized access, or data could be disclosed via a storage dump.

Known solutions deal with storing sensitive data at rest; e.g., on USB sticks with encryption capabilities, hard disk encryption, etc.

Sensitive data in a main memory of an operating system can be accessed via sniffer tools, dumps, etc. Cryptographic operations are known, for example, where encryption key and data are kept in a clear form in the main memory. Also, a secure key concept is known where secure keys are stored in secure, tamperproof hardware areas, wherein sensitive data is still located in the main memory of the operating system.

In the Patent Application Publication US 2008/0104709 A1, "System and Method for Secure Data Storage" by Averyt et al., a system and method for secure data storage are disclosed.

The disclosed system comprises a protected storage area located outside the main memory and including cryptographic key for protection of sensitive data and application code required for operation of the cryptographic key. A host system sends data to a secure storage processor where it is encrypted, stored, and a globally unique identifier is transmitted to the host system. The globally unique identifier is associated with the stored encrypted data and can be used in future interactions with the secure storage processor, such as a transaction request. A host system will transmit a transaction request and a globally unique identifier to the secure storage processor. The secure storage processor will process the transaction utilizing the stored encrypted data associated with the globally unique identifier, and will transmit a response indicating the failure or success of the transaction. In addition, the system is configured to facilitate information retrieval, wherein the secure storage processor sends the stored encrypted data to a requesting host system. Since the host system transmits a request to process a transaction to the secure storage processor, the transaction is permanently located in the secure storage and executed on request and no dynamic loading of new user/customer written functions is possible.

SUMMARY OF THE INVENTION

The present invention provides a computer system and a method for secure data handling in a computer system, which are able to improve the secure data processing and are not restricted to available crypto functions in hardware but are open to new algorithms including crypto algorithms, and to provide a data processing program and a computer program product to perform the method for secure data handling in a computer system.

Accordingly, in an embodiment of the present invention a computer system comprises a first storage area accessible by an operating system and a second storage area which is accessible by authorized functions only, wherein at least one protected storage area is implemented into the second storage area. The operating system installs at least one secret key and/or at least one customized processing function into regions of the at least one protected storage area and transfers data and/or parameters to process into regions of the at least one protected storage area. Additionally, the operating system selects one of the customized processing functions to execute, wherein the selected customized processing function is executed and accesses storage regions of the at least one protected storage area to process the data and/or the parameters. The resulting process data is read from the at least one protected storage area.

In further embodiments of the present invention, the computer system comprises interface means accessing the at least one protected storage area by performing defined access functions restricting the access to the at least one protected storage area.

In further embodiments of the present invention, the interface means are designed to request storage regions inside the protected storage area and to transfer the data and/or the parameters to process and/or secret keys to the at least one protected storage area inside the second storage area, wherein the interface means are performing predefined read functions to read resulting process data from the at least one protected storage area.

In further embodiments of the present invention, each storage region is assigned to one customized processing function and comprises at least one region for data to process and/or at least one region for a secret key and/or at least one region for parameters to process and/or at least one region for a signature and/or a region for an identification.

In further embodiments of the present invention, the first storage area comprises an operating system storage area and/or the second storage area comprises a hardware system storage area.

In further embodiments of the present invention, multiple operating systems are run on the computer system comprising at least one central processing unit.

In further embodiments of the present invention, the data to process is stored in a database in encrypted form and/or in clear form, wherein the database is located in the first storage area.

In another embodiment of the present invention, a method of secure data handling in a computer system, comprising a first storage area accessible by an operating system and a second storage area which is accessible by authorized functions only, is implementing at least one protected storage area into the second storage area, wherein at least one secret key and/or at least one customized processing function are installed into regions of the at least one protected storage area. Additionally, data and/or parameters to process are transferred into regions of the at least one protected storage area, wherein one of the customized processing functions is selected to execute. The selected customized processing function is executed and accesses storage regions of the at least one protected storage area to process the data and/or the parameters. The resulting processed data are read from the at least one protected storage area.

In further embodiments of the present invention, the at least one protected storage area is accessible by defined access functions only restricting the access to the at least one protected storage area.

In further embodiments of the present invention, the at least one customized processing function is signed with a first secret key, wherein a signature of every installed customized processing function is checked using a dedicated second secret key entitled for the corresponding protected storage area.

In further embodiments of the present invention, the secret keys might be imported from another region of the protected area and/or the first storage area and/or the second storage area and/or from an external storage area.

In further embodiments of the present invention, the data to process is stored in a database in encrypted and/or clear form, wherein the database is located in the first storage area and/or in an external storage area.

In further embodiments of the present invention, the encrypted data and/or parameters to process are transferred to the at least one protected storage area inside the second storage area, wherein the data and/or parameters to process are decrypted by a first customized processing function and processed by a second customized processing function inside the at least one protected storage area, wherein processed data is encrypted again by a third customized processing function and send back to the database.

In another embodiment of the present invention, a data processing program for execution in a data processing system comprises software code portions for performing a method of secure data handling in a computer system when the program is run on the data processing system.

In yet another embodiment of the present invention, a computer program product stored on a computer-usable medium, comprises computer-readable program means for causing a computer to perform a method of secure data handling in a computer system when the program is run on the computer.

All in all, embodiments of the present invention solve the problem of processing sensitive data in system storage securely by introducing new functionality for establishing a protected storage area which is located outside the main system memory area and is provided by a hardware system storage area or system firmware or any BIOS implementation or successors of current BIOS implementations on hardware platforms. Access to the protected storage area is provided via an interface unit similar to a device driver, for example. The core idea of the present invention is to provide a method of secure data handling in a computer system wherein operating systems request protected storage areas to store information, data, secret keys, or customized processing function codes. The term protected storage area means that this storage area will not be accessible by any unauthorized storage dump or browse. The operating system installs secret keys and/or customized processing functions like encryption algorithms and/or plug-ins into the protected storage area and moves data and/or parameters to process into the protected storage area. Additionally, the operating system selects a plug-in to execute and the required data/keys areas. The customized processing functions may, for example, be executed by firmware of the computer system in a so called sand-box where only the selected protected areas are accessible. The operating system may only be allowed to read the resulting data from the protected area.

The operating systems can temporarily or persistent store secret information at a secure location. But data can not only be stored in the protected area, but also processed in the protected area. The handling of secure data is not restricted to available crypto functions in hardware because additional customized processing function code may be pushed dynamically into the protected storage area so the computer system is open for new crypto algorithms. Customized processing functions are therefore flexibly exchangeable. Embodiments of the present invention offer dynamic exchangeable functions, same treatment for sensitive data and parameters and a concept of signatures to ensure integrity of loaded function code. Additional virtualization support for multiple operating systems is provided running on the same hardware platform. Also, support for personalized customized processing functions written by customer is provided and can be dynamically loaded at any time. The data and parameters are coupled with customized processing functions, wherein the identification of the protected area is used to run a stored customized processing function inside the protected storage area and cannot be used to read back the data if specified as write only. Even if the operating system is compromised, it is not possible to read or use the data of the protected storage area.

The above, as well as additional purposes, features, and advantages of the present invention, will become apparent in the following detailed written description.

BRIEF DESCRIPTION OF THE DRAWINGS

An embodiment of the invention, as described in detail below, is shown in the drawings, in which.

DETAILED DESCRIPTION OF THE PREFERRED EMBODIMENTS

Figure 1:
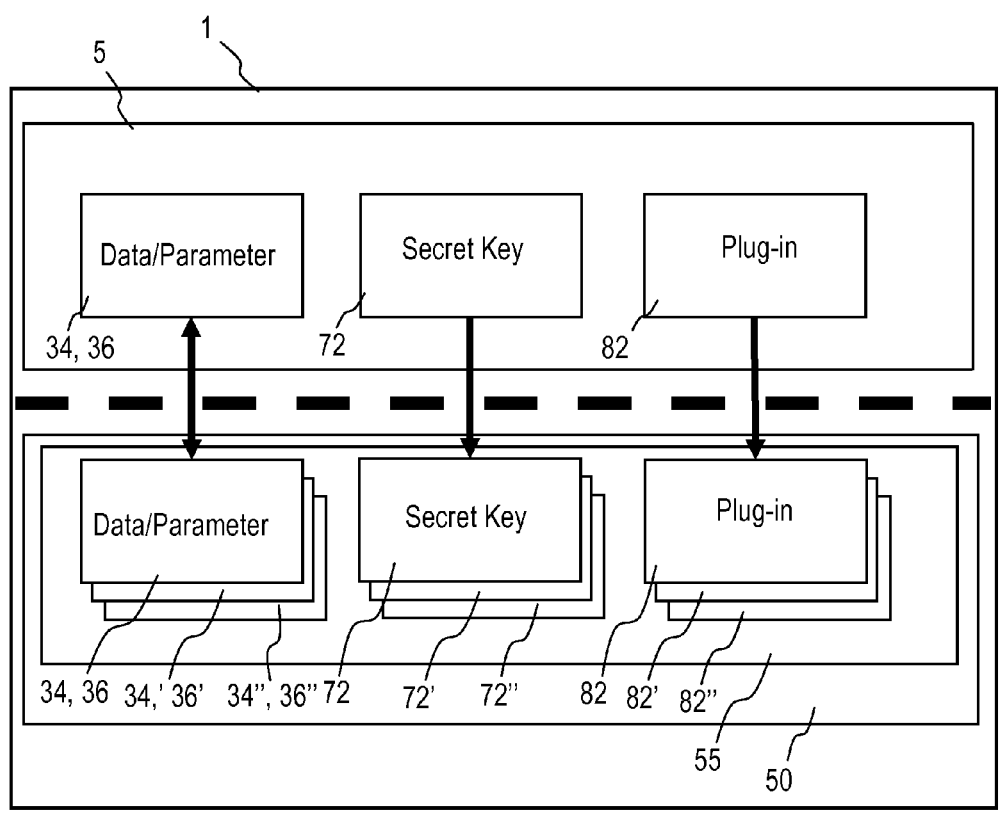
FIG. 1 is a schematic block diagram showing the data exchange between a first storage area and a second storage area of a computer system, in accordance with an embodiment of the present invention.
Figure 2:
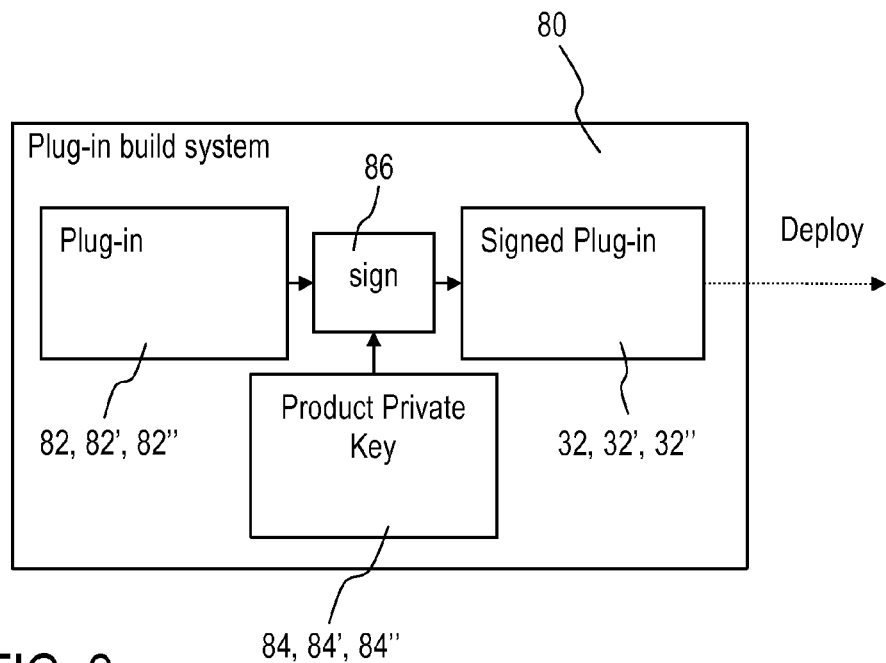
FIG. 2 is a schematic block diagram of a plug-in build system used to generate signed customized processing functions used in the computer system shown in FIG. 1.
Figure 3:
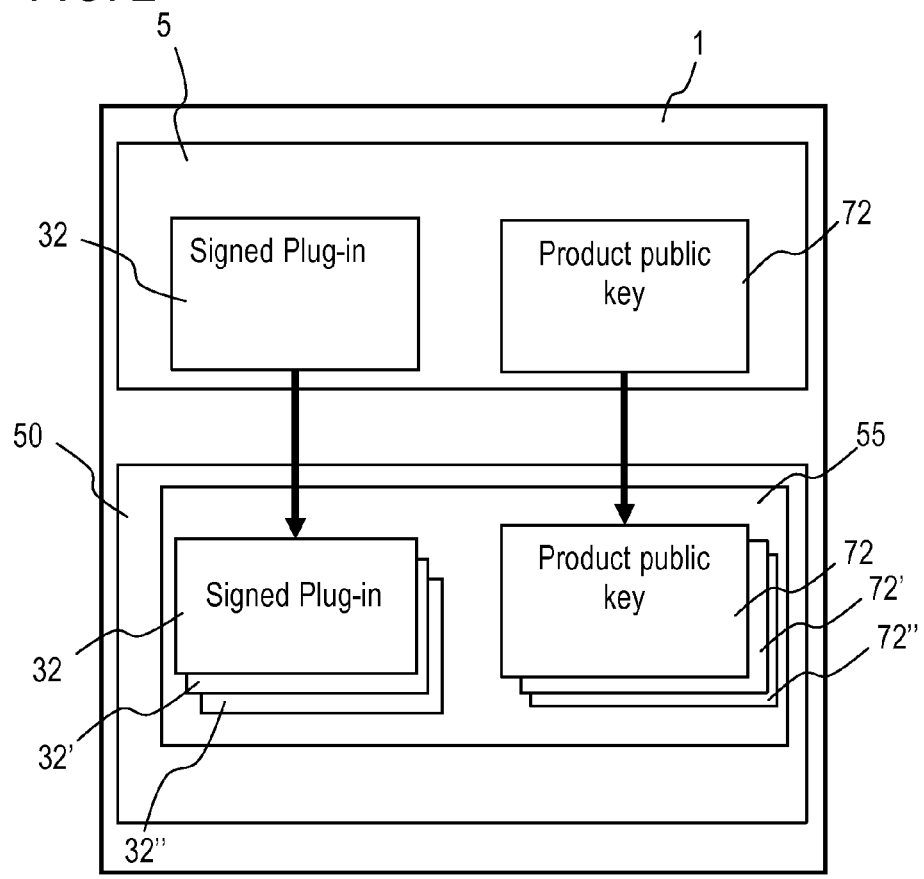
FIG. 3 is a schematic block diagram showing the implementation of signed customized processing functions in the computer system shown in FIG. 1.

FIG. 1 is a schematic block diagram showing the data exchange between a first storage area 5 and a second storage area 50 of a computer system 1, in accordance with an embodiment of the present invention, FIG. 2 is a schematic block diagram of a plug-in build system 80 used to generate signed customized processing functions 32, 32', 32" used in the computer system shown in FIG. 1, and FIG. 3 is a schematic block diagram showing the implementation of signed customized processing functions 32, 32', 32" in the computer system 1 shown in FIG. 1.

Referring to FIG. 1 the first storage area 5 is accessible by an operating system and the second storage area 50 is accessible by authorized functions only. According to the invention, at least one protected storage area 55 is implemented into the second storage area 50, wherein the operating system installs at least one secret key 72, 72', 72" and/or at least one customized processing function 82, 82', 82" also called plug-in into regions of the at least one protected storage area 55. The term protected storage area 55 means that only specially authorized firmware programs have access to the protected storage area 55 and that this storage area 55 will not be accessible by any unauthorized programs or storage dump or browse etc. Additionally, the operating system transfers data 36, 36', 36" and/or parameters 34, 34', 34" to process into regions of the at least one protected storage area 55 and selects one of the customized processing functions 82, 82', 82" to execute. The selected customized processing function 82, 82', 82" is executed and accesses storage regions of the at least one protected storage area 55 to process the data 36, 36', 36" and/or the parameters 34, 34', 34", wherein resulting process data is read from the at least one protected storage area 55. A plug-in 82, 82', 82" in accordance with the present invention comprises compiled and/or executable code and is executed in the protected storage area 55 not accessible by the operating system. Such a plug-in 82, 82', 82" can only operate on its given parameters 34, 34', 34" and/or data 36, 36', 36". Additionally, some machine instructions are restricted to prevent, that actions outside the protected storage area 55 are executed. Preferably the plug-ins 82, 82', 82" are signed before deployment so that signed plug-ins 32, 32', 32" are used. The customized processing functions 82, 82', 82" may, for example, be executed by firmware of the computer system 1 in a so called sand-box where only regions of the selected protected storage area 55 are accessible. The operating system is only allowed to read the resulting data from the protected area to restrict the access to the protected storage area 55.

Preferably, the customized processing functions 82, 82', 82" are signed with related first secret keys 84, 84', 84", also called product private keys, shown in FIG. 2. Referring to FIG. 2, every customized processing function 82, 82', 82" is signed by using a sign process 86 and a related first secret key 84, 84', 84" to create a corresponding signed customized processing function 32, 32', 32". Referring to FIG. 3, the signed customized processing functions 32, 32', 32" are loaded to the protected storage area 55 together with related second secret keys 72, 72', 72" also called product public keys. The dedicated second secret keys 72, 72', 72" entitled for the protected storage area 55 are used to check a signature of every installed customized processing function 82, 82', 82".

The illustrated embodiment of the present invention improves the secure data processing by introducing new functionality for establishing the protected storage area 55 which is located outside the main system memory 5 and is provided by a hardware system storage area 50 or system firmware or any BIOS implementation or successors of current BIOS implementations on hardware platforms. Access to the protected storage area 55 is provided via an interface unit 40 shown in FIG. 4 similar to a device driver, for example. The core idea of this invention is to provide a method of secure data handling in a computer system 1, wherein operating systems request the protected storage area 55 to store information, data 36, 36', 36", parameters 34, 34', 34", secret keys 72, 72', 72" or customized processing functions 82, 82', 82". By using the customized processing functions 82, 82', 82", the user is able to implement new crypto algorithms and is not restricted to available crypto functions in hardware.

Figure 4:
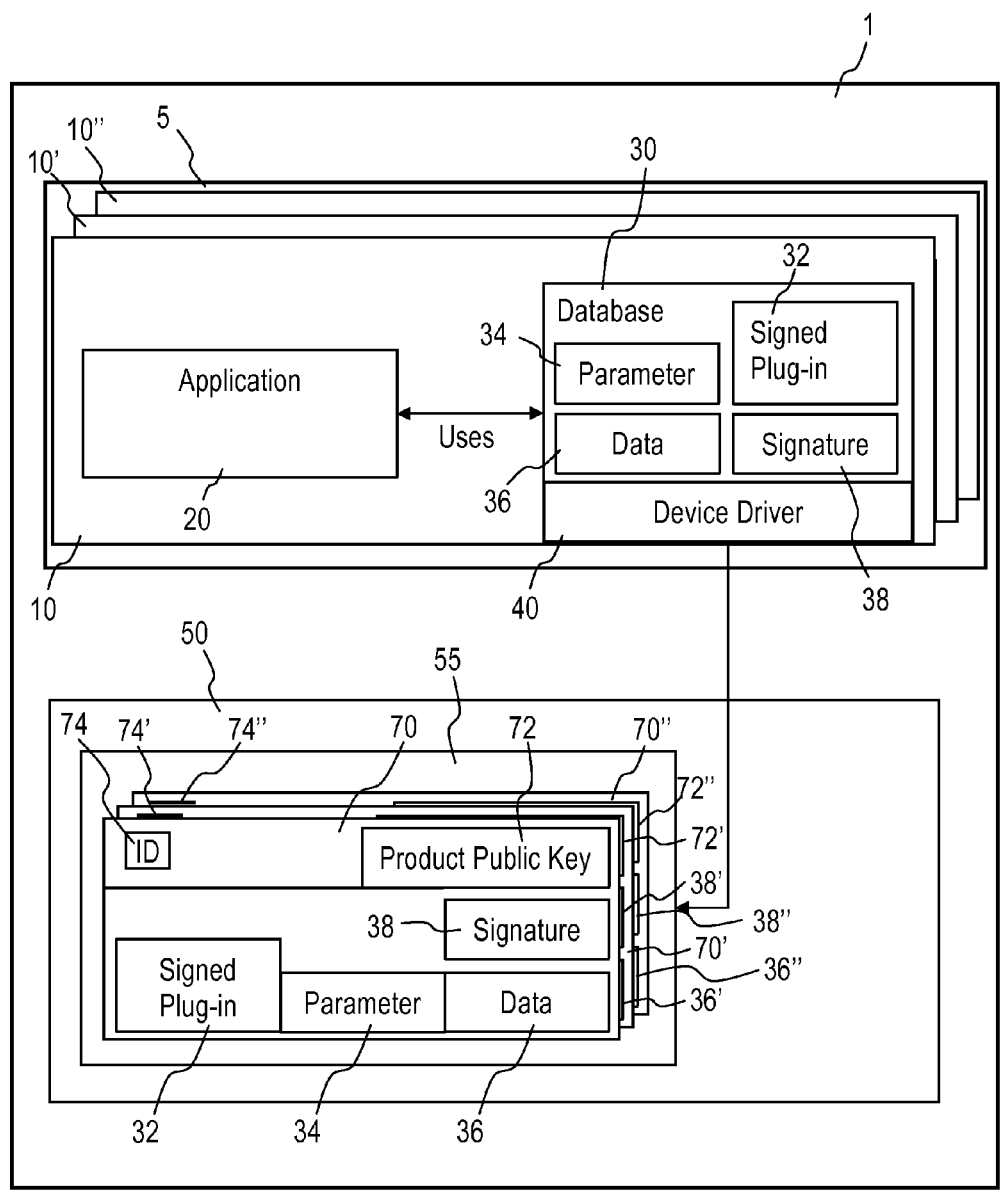
FIG. 4 is a more detailed block diagram of a computer system, in accordance with an embodiment of the present invention.

FIG. 4 is a more detailed block diagram of the computer system 1, in accordance with an embodiment of the present invention.

Referring to FIG. 4 the first storage area 5 comprises an operating system storage area which is divided into a number of logical partitions 10, 10', 10" commonly called LPARs. The LPARs 10, 10', 10" are each a subset of computer's hardware resources, virtualized as a separate computer. In effect, a physical machine can be partitioned into multiple LPARs 10, 10', 10" each housing a separate operating system. By using the LPARs 10, 10', 10", the computer system 1 is able to run multiple operating systems and comprises at least one central processing unit, not shown. The LPARs 10, 10', 10" may run different applications 20 which in the shown embodiment use an encrypted database 30 for secure data processing. The plug-ins 82, 82', 82" or the signed plug-ins 32, 32', 32" may be stored as binary objects in the database 30, which is implemented as DB2 Database for example, together with corresponding parameters 34, 34', 34", signatures 38, 38', 38" and/or data 36, 36', 36". Since the plug-ins 82, 82', 82" have access to all the data 36, 36', 36" and secret keys 72, 72', 72" signing the plug-ins 82, 82', 82" and generating signed plug-ins 32, 32', 32" increases the security of the data handling and prevents an attacker from deploying malicious plug-ins. The signature 38, 38', 38" of every loaded signed plug-in 32, 32', 32" is checked by firmware, for example, using the second secret keys 72, 72', 72" entitled for the protected storage area 55.

The computer system 1 comprises the interface means 40 for accessing the protected storage area 55 by performing defined access functions restricting the access to the protected storage area 55. The interface means 40 comprises a device driver, for example, designed to request storage regions 70, 70', 70" inside the protected storage area 55 and to transfer the data 36, 36', 36" and/or parameters 34, 34', 34" to process and/or the second secret keys 72, 72', 72" to the at least one protected storage area 55 inside the second storage area 50. To restrict the access to the protected storage area 55 the interface means 40 performs predefined read functions to read resulting process data from the at least one protected storage area 55. Each storage region 70, 70', 70" is assigned to one customized processing function or plug-in 82, 82', 82" and comprises at least one region for the data 36, 36', 36" to process and/or at least one region for the second secret keys 72, 72', 72" and/or at least one region for the parameters 34, 34', 34" to process and/or at least one region for the signature 38, 38', 38" and/or a region for an identification 74, 74', 74" to identify a corresponding customized processing function 82, 82', 82". Therefore, the interface means 40 is designed to move function code of the plug-ins 82, 82', 82" and/or signed plug-ins 32, 32', 32" together with parameter 34, 34', 34" and data 36, 36', 36" to the protected storage area 55. Additionally, the interface means 40 is designed to clear regions inside the protected storage area 55, to release regions inside the protected storage area 55, to read and/or write data 36, 36', 36" and/or parameters 34, 34', 34" and/or secret keys 72, 72', 72" and/or function code of plug-ins 82, 82', 82" and/or signed plug-ins 32, 32', 32" into the protected storage area 55. Further, the interface means 40 is able to execute plug-ins 82, 82', 82" and/or signed plug-ins 32, 32', 32" inside the protected storage area 55 and to copy the content of regions inside the protected storage area 55 to larger areas to resize the protected storage area 55.

The operating system initializes the interface means 40, reads data from the interface means 40 and/or writes data to the interface means 40, defines and/or executes plug-ins 82, 82', 82" and/or signed plug-ins 32, 32', 32" and/or terminates the interface means 40.

The application 20 and/or software of the encrypted database 30 and/or the customer implement the signed plug-ins 32, 32', and 32". The interface means 40 requests regions inside the protected storage area 55 for the encrypted database 30, the processing result, the second secret keys 72, 72', 72" and/or code for the signed plug-ins 32, 32', 32" and stores the second secret keys 72, 72', 72" (public keys) used to verify the signatures 38, 38', 38" of the signed plug-ins 32, 32', 32" in regions of the protected storage area 55. Then the interface means 40 writes the data 36, 36', 36", the second secret keys 72, 72', 72", the parameters 34, 34', 34" and/or the code of the signed plug-ins 32, 32', 32" from the operating system storage area 5 to the protected storage area 55. The regions for the secret keys 72, 72', 72" are marked write only, the regions of the data 36, 36', 36" are marked write only for normal data and read only for resulting processed data or processed data of defined intermediate results. The second secret keys 72, 72', 72" for checking the signature 38, 38', 38" of every installed signed customized processing function 32, 32', 32" may be imported from another region of the protected area 55 and/or the operating system storage area 5 and/or the second storage area 50 and/or from an external storage area. After the implementation of the signed plug-ins 32, 32', 32" one of the signed plug-ins 32, 32', 32" may be selected by the application 20 using the encrypted database 30. Then the selected signed plug-in 32, 32', 32" is executed with user based parameters 34, 34', 34" and the resulting processed data is written into regions of the operating system storage area 5 or the modified database is read back to the operating system storage area 5. Then the same signed plug-in 32, 32', 32" with new user based parameters 34, 34', 34" or another signed plug-in 32, 32', 32" may be executed.

Figure 5:
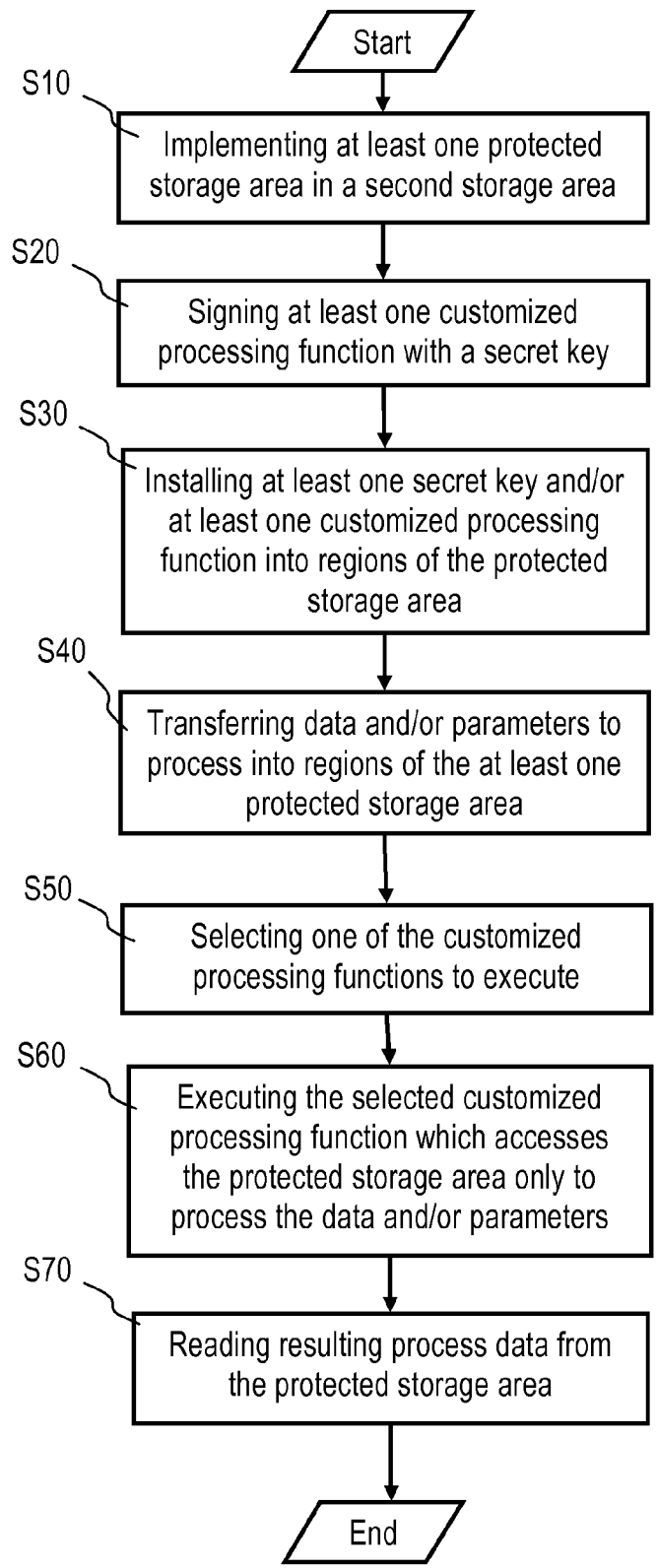
FIG. 5 is a schematic flow chart of a method of secure data handling in a computer system shown in FIGS. 1 to 4.

FIG. 5 is a schematic flow chart of a method of secure data handling in the computer system 1, in accordance with an embodiment of the present invention.

Referring to FIG. 5 the flowchart depicts how the computer system 1 is performing secure data handling. After an initialization at least one protected storage area 55 is implemented into the second storage area 50 in step S10. In step S20 at least one customized processing function or plug-in 82, 82', 82" is signed with a first secret key 84, 84', 84" (product private key) to create at least one signed customized processing function or signed plug-in 32, 32', 32". In step S30 at least one second secret key 72, 72', 72" (product public key) and/or at least one signed customized processing function 32, 32', 32" are installed into regions 70, 70', 70" of the at least one protected storage area 55. In step S40 data 36, 36', 36" and/or parameters 34, 34', 34" to process are transferred into regions 70, 70', 70" of the at least one protected storage area 55. In step S50 one of the signed customized processing functions 82, 82', 82" is selected to execute, wherein the selected signed customized processing function 82, 82', 82" is executed in step S60 and accesses storage regions of the at least one protected storage area 55 to process the data 36, 36', 36" and/or the parameters 34, 34', 34". In step S70, the resulting process data are read from the at least one protected storage area 55. The at least one protected storage area 55 is accessible by defined access functions only restricting the access to the at least one protected storage area 55. The data 36, 36', 36" to process is stored in the database 30 in encrypted and/or clear form, wherein the database 30 is located in the first storage area 5 and/or in an external storage area.

If an encrypted database 30 is used, like in the shown embodiment, the encrypted data 36, 36', 36" and/or parameters 34, 34', 34" to process are transferred to the at least one protected storage area 55 inside the second storage area 50. Inside the protected storage area 55 the data 36, 36', 36" and/or parameters 34, 34', 34" to process are decrypted by a first customized processing function 82, 82', 82" or a first signed customized processing function 32, 32', 32" and processed by a second customized processing function 82, 82', 82" or a second signed customized processing function 32, 32', 32" inside the at least one protected storage area 55. Then the processed data is encrypted again by a third customized processing function 82, 82', 82" or a third signed customized processing function 32, 32', 32" inside the protected storage area 55 and send back to the encrypted database 30.

Embodiments of the invention may be implemented as an entirely software embodiment, or an entirely hardware embodiment, or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention may store secret information temporarily or persistently at a secure location, wherein data cannot only be stored in the secured area, but also processed in the secured area.

Further embodiments of the present invention allow flexible and dynamic processing of sensitive data with no possibility to access sensitive data from the operating system. Embodiments of the present invention offer a general mechanism to execute code in a secure and protected environment and enable a customer to create own customized processing functions or plug-ins.

Additionally, the customer created customized processing functions or plug-ins may be loaded in encrypted form in the protected storage area.

What is claimed is:

1. A computer system, comprising:
a first storage area accessible by an operating system and a second storage area which is accessible by authorized functions only, wherein at least one protected storage area is implemented within said second storage area, wherein said operating system dynamically installs at least one secret key and a plurality of signed customized processing functions into regions of said at least one protected storage area, wherein said regions into which are installed said at least one secret key are specified as write only, and wherein said operating system transfers data and/or parameters to process into regions of said at least one protected storage area, wherein said regions into which are transferred said data are specified as write only, and wherein said operating system selects one of said signed customized processing functions to execute, and wherein said selected signed customized processing function includes a cryptographic algorithm,
wherein a signature of said selected signed customized processing function is checked using said at least one secret key,
wherein said selected signed customized processing function is executed and accesses storage regions of said at least one protected storage area to process said data and/or said parameters, wherein resulting process data is read from a region of said at least one protected storage area, and wherein said region from which is read said resulting process data is specified as read only.

2. The computer system according to claim 1, further comprising an interface for accessing said at least one protected storage area by performing defined access functions restricting said access to said at least one protected storage area.

3. The computer system according to claim 2, wherein said interface is designed to request storage regions inside said protected storage area and to transfer said data and/or said parameters to process and/or secret keys to said at least one protected storage area inside said second storage area, wherein said interface is performing predefined read functions to read resulting process data from said at least one protected storage area.

4. The computer system according to claim 2, wherein said interface copies content of one or more of said regions inside said at least one protected storage area to one or more larger areas to resize said at least one protected storage area.

5. The computer system according to claim 1, wherein each storage region is assigned to one of said signed customized processing functions and comprises at least one region for data to process and/or at least one region for a secret key and/or at least one region for parameters to process and/or at least one region for a signature and a region for an identification.

6. The computer system according to claim 1, wherein said first storage area comprises an operating system storage area and/or said second storage area comprises a hardware system storage area.

7. The computer system according to claim 1, wherein multiple operating systems are run on said computer system comprising at least one central processing unit.

8. The computer system according to claim 1, wherein said data to process is stored in a database in encrypted form and/or in clear form, wherein said database is located in said first storage area.

9. A method of secure data handling in a computer system, comprising a first storage area accessible by an operating system and a second storage area which is accessible by authorized functions only, the method comprising the steps of:
implementing at least one protected storage area into said second storage area;
dynamically installing at least one secret key and a plurality of signed customized processing functions into regions of said at least one protected storage area, wherein said regions into which are installed said at least one secret key are specified as write only;
transferring data and/or parameters to process into regions of said at least one protected storage area, wherein said regions into which are transferred said data are specified as write only;
selecting one of said signed customized processing functions to execute, wherein said selected signed customized processing function includes a cryptographic algorithm;
checking a signature of said selected signed customized processing function using said at least one secret key;
executing said selected signed customized processing function and accessing storage regions of said at least one protected storage area to process said data and/or said parameters; and
reading resulting process data from a region of said at least one protected storage area, wherein said region from which is read said resulting process data is specified as read only.

10. The method according to claim 9, wherein said at least one protected storage area is accessible by defined access functions only restricting said access to said at least one protected storage area.

11. The method according to claim 9, wherein each of said signed customized processing functions is signed with a first secret key, wherein a signature of every installed signed customized processing function is checked using a dedicated second secret key entitled for said corresponding protected storage area.

12. The method according to claim 11, wherein said secret keys are imported from another region of said protected storage area and/or said first storage area and/or said second storage area and/or from an external storage area.

13. The method according to claim 9, wherein said data to process is stored in a database in encrypted and/or clear form, wherein said database is located in said first storage area and/or in an external storage area.

14. The method according to claim 13, wherein said encrypted data and/or parameters to process are transferred to said at least one protected storage area inside said second storage area, wherein said data and/or parameters to process are decrypted by a first signed customized processing function and processed by a second signed customized processing function inside said at least one protected storage area, wherein processed data is encrypted again by a third signed customized processing function and sent back to said database.

15. A data processing program embodied in a computer-readable storage medium that is a tangible medium for execution in a data processing system comprising software code portions for performing a method of secure data handling in a computer system according to claim 9 when said program is run on said data processing system.

16. A computer program product stored on a computer-readable storage medium that is a tangible medium, comprising a computer-readable program for causing a computer to perform a method of secure data handling in a computer system according to claim 9 when said program is run on said computer.

17. A computer program product for secure data handling in a computer system, comprising a first storage area accessible by an operating system and a second storage area which is accessible by authorized functions only, the computer program product comprising:
program code provided on a computer-readable storage medium that is a tangible medium, wherein the program code, when executed by at least one processor in said computer system, cause said computer system to perform the steps of:
implementing at least one protected storage area into said second storage area;

dynamically installing at least one secret key and a plurality of signed customized processing functions into regions of said at least one protected storage area, wherein said regions into which are installed said at least one secret key are specified as write only;

transferring data and/or parameters to process into regions of said at least one protected storage area, wherein said regions into which are transferred said data are specified as write only;

selecting one of said signed customized processing functions to execute, wherein said selected signed customized processing function includes a cryptographic algorithm;

checking a signature of said selected signed customized processing function using said at least one secret key;

executing said selected signed customized processing function and accessing storage regions of said at least one protected storage area to process said data and/or said parameters; and reading resulting process data from a region of said at least one protected storage area, wherein said region from which is read said resulting process data is specified as read only.

\* \* \* \* \*